United States Patent [19]

Whalen

[11] E Re. 30,245

[45] Reissued Apr. 1, 1980

[54] TWO-RISER HEATING AND COOLING UNIT

[75] Inventor: James J. Whalen, Fulton, Md.

[73] Assignee: The Whalen Company, Baltimore, Md.

[21] Appl. No.: 834,838

[22] Filed: Sep. 19, 1977

Related U.S. Patent Documents

Reissue of:

[64] Patent No.: 3,765,476
Issued: Oct. 16, 1973
Appl. No.: 248,804
Filed: May 1, 1972

[51] Int. Cl.[2] ..... F25B 29/00

[52] U.S. Cl. ..... 165/16; 165/22; 165/35

[58] Field of Search ..... 165/22, 26, 27, 29, 165/35, 50, 96, 16, 103; 62/324

[56] References Cited

U.S. PATENT DOCUMENTS

| | | | |
|---|---|---|---|
| 1,649,330 | 11/1927 | Torrance | 165/53 |
| 2,265,272 | 12/1941 | Ditzler | 62/140 |
| 2,715,514 | 8/1955 | Stair | 257/3 |
| 2,743,908 | 5/1956 | Tanner | 257/9 |
| 2,794,624 | 6/1957 | Campagna et al. | 257/8 |
| 3,074,477 | 1/1963 | Whalen | 165/56 |
| 3,252,507 | 5/1966 | Conroy | 165/22 |
| 3,377,545 | 4/1968 | Tveit | 165/26 X |
| 3,472,313 | 10/1969 | Milgram et al. | 165/22 |
| 3,523,575 | 8/1970 | Olivieri | 165/22 |
| 3,524,328 | 8/1970 | Schuster | 165/22 |
| 3,547,186 | 12/1970 | McGrath | 165/22 |
| 3,603,379 | 9/1971 | Leonard | 165/2 |
| 3,648,766 | 3/1972 | Whalen | 165/39 |
| 3,650,318 | 3/1972 | Avery | 165/35 X |
| 3,685,575 | 8/1972 | Henriot | 165/48 |
| 3,722,580 | 3/1973 | Braver | 165/50 |
| 3,765,476 | 10/1973 | Whalen | 165/16 |
| 3,766,750 | 10/1973 | Aoh et al. | 62/259 |

*Primary Examiner*—Samuel Scott
*Assistant Examiner*—Margaret A. Focarino
*Attorney, Agent, or Firm*—Lane, Aitken & Ziems

[57] ABSTRACT

A heating and cooling unit for installation in a building and including a pair of vertically extending risers extending for the length of a housing and adapted for connection to risers of corresponding units located on adjacent floors to form a continuous flow circuit for a heat exchange medium through all of the units. The housing is adapted to receive a reversible air conditioning unit and provides for connections between the unit and the risers. Heat exchange fins may be associated with the risers to form a riser heat exchanger. The air conditioning unit can be used in a standard cycle cooling mode or in a reverse cycle heating mode, and can be used in conjunction with, or independent of, the riser heat exchanger. A fan is provided in the housing to circulate air from the particular room, through the housing and back into the room.

20 Claims, 9 Drawing Figures

TWO-RISER HEATING AND COOLING UNIT

Matter enclosed in heavy brackets [ ] appears in the original patent but forms no part of this reissue specification; matter printed in italics indicates the additions made by reissue.

BACKGROUND OF THE INVENTION

This invention relates to a heating and cooling unit and more particularly to a two-riser unit to selectively heat or cool a room in which it is installed.

Various types of water systems have been proposed for heating and/or cooling a plurality of rooms in a building. In the basic water system, heat exchange units are provided in the various rooms and are connected with a main flow circuit which includes a central water heating apparatus, a central water cooling apparatus, or both. The heating or cooling apparatus raises or reduces the temperature of the water and a pump forces the water into the main flow circuit and through the heat exchanger, after which it is returned to the apparatus for either heating or cooling.

In the majority of these types of water systems the main flow circuit for the water is usually offset, or spaced, from the individual units in the room. This requires a great deal of laterally extending, branch conduits to connect the main flow circuit to each unit. The large number of branch conduits required in large installations considerably adds to the cost of the system, both from a materials and a labor standpoint.

To further compound the cost problem, the use of both a central water heating apparatus and a central water cooling apparatus considerably adds to the cost of the rental or purchase price of each individual room in the building. Therefore, in climates in which only one operational mode is absolutely necessary, some residents of a particular building may also have to pay for a central apparatus for the other mode even though they do not particularly desire same, either for personal reasons, or due to the particular exposure of their apartment, etc.

SUMMARY OF THE INVENTION

It is therefore an object of the present invention to provide a package heat exchange unit which can be easily installed in a building with a minimum of pipe fitting and labor costs.

It is a further object of the invention to provide a unit which is basically a two-riser unit which is adapted to receive a reverse cycle air conditioning unit to provide added flexibility and to avoid the problems noted above.

DESCRIPTION OF THE PREFERRED EMBODIMENTS

Figure 1:
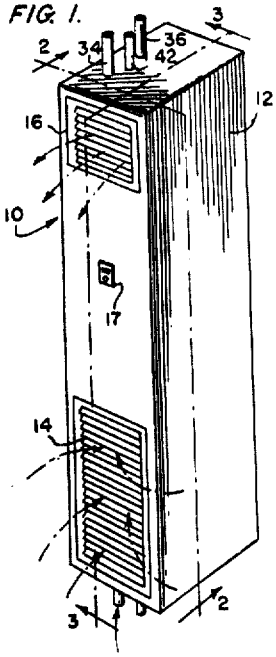
FIG. 1 is a perspective view of the heating and cooling unit of one embodiment of the present invention.

The unit of the embodiment of FIGS. 1–4 is shown in general by the reference numeral 10 and comprises an elongated housing 12 adapted to extend from the floor to the ceiling of the room in which it is mounted. The front wall of the housing 12 has two elongated openings at the lower and upper portion thereof to receive an air intake grill 14 and an air outlet grill 16, respectively. A thermostat 17 is mounted in the front wall of the housing for controlling the operation of the unit in a manner to be described in detail.

Figure 2:
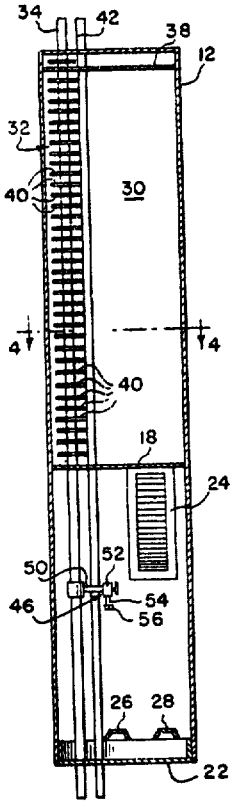
FIGS. 2 and 3 are vertical cross-sectional views taken along the lines 2—2 and 3—3, respectively, of FIG. 1.
Figure 3:
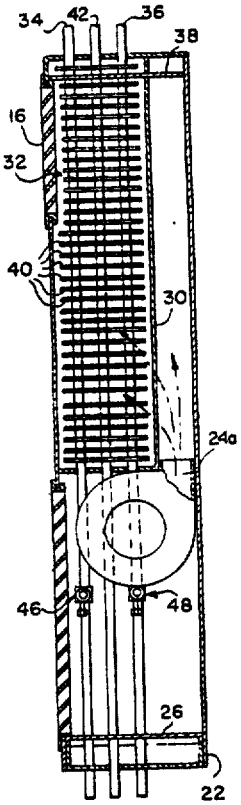
Figure 4:
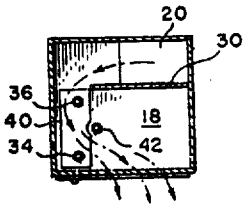
FIG. 4 is a horizontal cross-sectional view taken along the line 4—4 of FIG. 2.

Referring to FIGS. 2–4, a transverse horizontal partition 18 is mounted in the housing 12 to divide the housing into an upper and lower compartment. The upper right section of the partition 18, as viewed in FIG. 4, is cut out to provide a fan discharge opening shown by the reference numeral 20.

The lower compartment defined by the partition 18 contains a drain pan 22 which forms the floor of the housing 12 and a scroll fan 24 mounted immediately below the partition 18. The scroll fan 24 is of the conventional type which draws air axially in both ends thereof and forces it tangentially through an outlet 24a which registers with the discharge opening 20. For further details of the drain pan 22 and the scroll fan 24, including the manner in which the latter is mounted in the housing, reference is made to applicant's copending U.S. patent application Ser. No. 854,038, filed on Aug. 29, 1969, and assigned to same assignee as the present invention, the disclosure of this application hereby being incorporated by reference.

A pair of horizontally extending support braces 26 and 28 extend from front to rear of the housing and are secured to the front and rear walls thereof immediately above the drain pan 22, in any conventional manner, such as by the use of the sheet metal screws. The purpose of the support braces 26 and 28 are to receive an optional reversible air conditioning unit to be described in detail.

A vertically extending partition 30 is located immediately adjacent the fan discharge opening 20 and extends from the partition 18 to the upper portion of the housing 12 and parallel to the front wall of the housing to further compartmentalize the interior of the housing.

A riser heat exchanger, shown in general by the reference numeral 32 is disposed in the upper compartment of the housing 12. The heat exchanger 32 comprises two vertically extending spaced risers 34 and 36 which extend the entire length of the housing with their ends projecting slightly from each end of the housing. The upper portions of the risers 34 and 36 are supported by means of a horizontally extending partition 38 which is secured in the housing 12 near the upper end thereof. The heat exchanger 32 also includes a plurality of rectangular, spaced plates 40 extending over the risers 34 and 36 with openings being provided in the plates to receive the risers.

One side portion of each of the plates 40 is notched to accommodate a drain riser 42 which extends for the entire length of the housing 12 to provide a draining function which also will be described in detail.

The unit 10 is designed for installation in a multistory building and the portions of the risers 34, 36, and 42 which project from the upper and lower ends of the housing 12 are of a precise predetermined length to enable them to be directly connected to corresponding risers of identical units formed on floors of the building adjacent to the floor in which the unit 10 is mounted. The connections would most likely be made in bores formed in the floor (or ceiling) of the particular rooms involved, with the connections being made in any conventional manner such as by tubular dual coupling devices, etc.

In the preferred operation of the unit of FIGS. 1–4, one set of the risers 34 and 36 installed in the above manner is connected to a central heating system which may be in the form of a boiler, or the like, for heating water supplied thereto from a municipal supply, or the like. This water is heated to a relatively high temperature and is pumped directly from the boiler through the riser 34, and the corresponding risers of the units on adjacent floors connected to the riser 34, and is returned by the riser 36 and its corresponding risers. For example, if the boiler is located in the basement of the building, it would be connected to the lowermost riser 34 and a pump would be provided to pump the relatively hot water from the boiler upwardly through the latter riser and its corresponding risers, to the top of the building whereby a U-shaped connection, or the like, would reverse the direction of flow and permit return of the water through the riser 36 and its corresponding risers.

The risers 34 and 36 are provided with coupling devices 46 and 48 respectively in order to enable them to be connected in a flow circuit of a reversible air conditioning unit which may be installed in the lower compartment of the housing 12. The details of the coupling device 46 is better shown with reference to FIG. 2, it being understood that the coupling device 48 is identical. In particular, the coupling device 46 comprises a horizontal pipe 50 registering the riser 34 and having a valve member 52 fixed at one end thereof for regulating the flow of water therethrough. A vertical pipe 54 is connected at one end to the valve member 52 and at the other end to a standard coupling device 56, which, in turn, is adapted for connection to a pipe in a conventional manner. For example, the coupling device 56 may be internally threaded and rotatable relative to the vertical pipe 54 in order to be threadably engagable with an externally threaded pipe, which in this case would be the pipe of the above-mentioned air conditioning unit.

The unit 10 of the embodiment of FIGS. 1–4, and other corresponding units, would be installed in a building with the valves 52 on the risers 34 and 36 shut off and without the air conditioning unit installed within the housing 12. As such, the unit is operable in one mode only, such as heating, in which case the water is heated by the heating system described above and is passed in a continuous flow circuit through the risers 34 and 36 and their corresponding risers, whereby the heat exchanger 32 is maintained at a relatively high temperature.

In this arrangement the thermostat 17 is adapted to control the operation of the fan 24 in order to turn the latter on and off in response to temperature variations in the room. Actuation of the fan 24 causes air to pass into the lower position of the housing 12 through the inlet grill 14, through the discharge opening 20 and upwardly into the upper compartment of the housing 12. The partition 30 directs the air through the heat exchanger 32 where it is heated before passing out the outlet grill 16, with the flow pattern being indicated by the arrows in FIG. 4.

The thermostat 17 can regulate the fan operation depending on the particular temperature conditions in the room to be heated. For example, if the temperature in the room is relatively low, the thermostat 17 will maintain the fan on to function in the above manner until the heated air brings the room temperature up to a predetermined value, at which time the thermostat will turn the fan off until the temperature again drops below a predetermined value.

It can be appreciated that the unit 10 is relatively inexpensive in cost since it is adapted for only one operational mode, and requires a minimum of installation materials and labor. Also, as will be more apparent from the following, the unit 10 can be easily converted to perform in both a heating and cooling mode without the necessity of adding a separate central cooling system.

FIGS. 5–8 depict the basic unit of the embodiment of FIGS. 1–4 but with two optional features added thereto. Since the basic structure shown in FIGS. 5–8 is identical to that of FIGS. 1–4, the same reference numeral will be used.

According to one of the above-mentioned features, a vertical partition 30a is provided which is identical to the partition 30 of the embodiment of FIGS. 1–4 with respect to both location and size with the exception that the width of the partition 30a is less than that of the partition 30. Also in the embodiment of FIGS. 5–8 a vertical brace 60 is provided which extends between the horizontal partitions 18 and 38 and which, together with the partition 30a, defines an elongated space 62 which provides an alternate flow path for air discharged into the discharge opening 20.

According to one of the above-mentioned features, a damper blade 64 is pivotally mounted to the brace 60 by means of a hinge 66. The hinge 66 is of a continuous flexible material, such as plastic, and is attached to the brace 60 and to the damper blade 64 to enable the latter to move between the two positions shown by the solid lines and by the dashed lines in FIG. 6.

Figure 6:
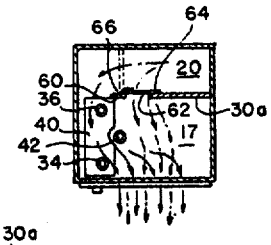
FIG. 6 is a vertical cross-sectional view taken along the line 6—6 of FIG. 5.
Figure 7:
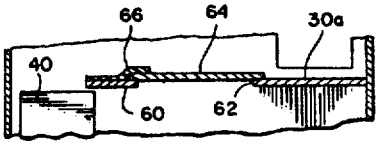
FIG. 7 is a partial, enlarged, sectional view of the hinge-damper blade connection of FIG. 6.

The connections between the brace 60, the hinge 66 and the damper blade 64 are shown in detail in FIG. 7 in the position shown by the solid lines in FIG. 6. In particular the hinge 66 extends over a portion of one face of the brace 60 and the blade 64 for their entire lengths, and may be attached to each in any conventional manner.

As shown in FIG. 6 the width of the damper blade 64 is sufficient to block air flow through the space 62 when the blade is in the position shown by the solid lines, and to block air flow through the heat exchanger 32 when in the position shown by the dashed lines.

The damper blade 64 is moved between the two positions shown by means of a damper rotor 68 which is mounted on the bottom surface of the partition 18 and which is electrically connected to, and controlled by, the thermostat 17 in the same manner that the thermostat of the previous embodiment controlled the operation of the fan 24.

The unit 10 can be operated in a single mode, such as heating, utilizing the damper blade 64 without any further additions or modifications to the unit. In this case the fan 24 operates continuously and the damper blade selectively directs the flow of air over the heat exchanger 32 or away from the heat exchanger depending on the particular room conditions. For example, and assuming the unit 10 is adapted to operate in a heating mode, if the temperature in the room is relatively low, the thermostat 17 will actuate the damper motor 68 in a manner to move the damper blade 64 to the position shown by the solid lines in FIG. 6, where it blocks air flow through the space 62 and permits flow through the heat exchanger 32. The air is then heated by the relatively warm temperatures at this heat exchanger due to the presence of the circulating hot water as discussed in connection with the embodiment of FIGS. 1-4, before the air exits through the outlet grill 16.

When the heated air passing outwardly from the outlet grill 16 brings the temperature of the room up to a predetermined temperature the thermostat 17 will cause the motor 68 to move the damper blade 64 to the position shown by the dashed lines in FIG. 6 and thus block the flow of air through the heat exchanger 32 and enable it to pass through the space 62 and out the outlet grill 16. Thus in this mode, air will be continually circulated through the room with the thermostat controlling whether the air that is passed back into the room is heated or not. It can be appreciated that this is especially advantageous in areas in which a continual circulation of air is advantageous, such as in rooms where there is a great deal of smoking, etc.

It is apparent that although the units of both of the previous embodiments have been described in connection with a heating function, they can just as easily be used in a cooling mode by simply passing relatively cool water from a cooling tower, or the like, through the heat exchanger 32.

Figure 5:
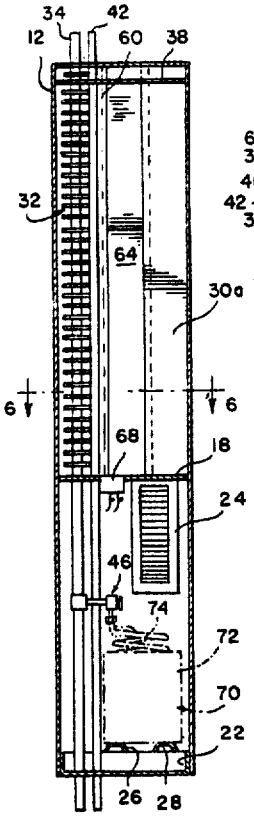
FIGS. 5 and 9 are views similar to FIG. 2 but depicting alternate embodiments of the present invention.
Figure 8:
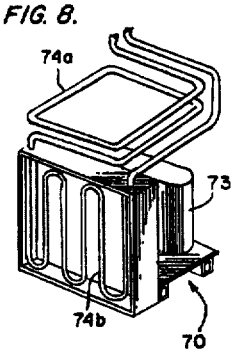
FIG. 8 is a perspective view of a standard air conditioning unit used in the unit of the present invention, with its outer casing being removed.

In accordance with another embodiment of the present invention, a reversible air conditioning unit shown in general by the reference numeral 70 in FIGS. 5 and with its outer casing removed in FIG. 8, is mounted in the lower compartment of the housing 12 with the latter unit being shown by dashed lines in FIG. 5 since it is an optional feature. This mounting is relatively simple and involves only removing the inlet grill 14, and sliding the unit 70 on the support braces 26 and 28 into the housing 12.

Since the unit 70 is of a conventional design, it will be described only in general terms for the purposes of the present invention. The unit 70 comprises a housing 72 which contains a compressor 73 and a flow circuit for circulating a heat exchange medium, such as a liquid coolant. The flow circuit is formed by a portion of coiled tubing 74a disposed on top of the housing 72 with the tubing being double jacketed, i.e. being comprised of an inner pipe through which the liquid coolant circulates, and a concentric outer pipe extending over the inner pipe to form a heat exchanger. The ends of this outer pipe are connected to the couplings 46 and 48, respectively, so that the water passing through the risers 32 and 34 and their corresponding risers is routed through this outer pipe in a heat exchange relation to the liquid coolant circulating through the inner pipe whereby the water either gives heat to, or takes heat from, the liquid coolant, depending on the operational mode of the unit 70.

The remaining portion of the flow circuit is formed by the portion of the above-mentioned inner pipe that is not surrounded by the outer pipe. This portion is shown by the reference numeral 74b and is coiled in a conventional manner to form a second heat exchanger positioned so that the liquid coolant is placed in a heat exchange relation to the air passing through the inlet grill 14. As a result the unit 70 can operate in a cooling mode in which the liquid coolant flows in one direction and the latter heat exchanger operates as an evaporator, whereby the liquid coolant evaporates and takes heat from the air to cool same, or as a condensor in which the liquid coolant flows in an opposite direction, condenses, and gives up heat to the air to heat same. A four-way valve is connected in the above-mentioned flow circuit to reverse the flow direction of the liquid coolant through the tubing portions 74a and 74b when the operational modes of the unit 70 are changed, in a conventional manner.

According to a preferred embodiment, the unit 10 incorporates both the air conditioning unit 70 and the movable damper blade 64, and, as such, can be operated in either an automatic mode or in a special heating mode. In the automatic mode a cooling tower supplies water to the riser 34 and its corresponding risers at a predetermined temperature range that is less than the temperature of the water supplied to the heat exchanger in the unit of the embodiment of FIGS. 1-4 when the latter unit is adapted for heating. This temperature range preferably is about 70°-90° F. so that the unit 70 will operate in both the standard cycle cooling mode and in the reverse cycle heating mode depending on the direction of flow of the coolant, as discussed above. As a result, the air passing from the inlet grill 14 and through the unit 70 will be cooled in the cooling mode, and heated in the heating mode, of the latter unit.

In the automatic mode, the fan 24 operates continuously and a function switch is provided on the same control panel as the thermostat 17 which, when moved to the automatic mode, will cause the damper motor 68 to move the damper blade 64 to the position shown by the dashed lines in FIG. 6, in which it blocks air flow through the heat exchanger 32 as long as the function switch is in the automatic mode. Since the connections between the function switch, the above-mentioned motor, and the damper blade are conventional, they will not be described in any further detail.

Also, in accordance with this embodiment the thermostat 17 is of a conventional "dead band" design which incorporates an element movable between two spaced fixed elements in response to temperature variations. These elements are connected in an electrical circuit with the above-mentioned four-way valve and the compressor 73 of the air conditioning unit 70. As a result, the operation of the compressor and the direction of circulation flow of the heat exchange medium in the unit 70, and therefore the cycle in which the latter operates, will be controlled in response to temperature variations in the room in which the unit is installed. This operation is such that, upon the movable element of the thermostat 17 contacting one fixed element in response to a predetermined elevated temperature, the compressor 73 will be turned on and the valve will move to a position whereby the unit operates in the cooling mode. Upon the temperature dropping a relatively small amount, the movable element will release from the latter fixed element, and the compressor 73 will be turned off to terminate the cooling function of the unit 70. Upon the temperature in the room dropping to such a degree that the movable element of the thermostat 17 moves to the other fixed element, the valve will be moved to a position to change the operation of unit 70 to the heating mode, and to turn the compressor 73 on.

Thus, the four-way valve which controls the air conditioning unit 70 will stay in a given position despite the movable element of the thermostat 17 leaving a fixed element. However, when the movable element moves over to make contact for the first time with the other fixed element the position of the four-way valve is changed. The compressor is turned on upon contact of the movable element with either fixed element and turned off whenever the movable element is not in contact with either of the two fixed elements.

In operation with the four-way valve in the heating position and the function switch in the automatic mode, the damper blade takes the position shown by the dashed lines in FIG. 6 as discussed above, and the fan 24 runs continuously. Assuming that the temperature in the room reaches a relatively high value, the movable element of the thermostat 17 will contact the fixed element which causes the four-way valve associated with the air conditioning unit 70 to move to a position in which the latter unit operates in its standard cooling cycle. As a result, the water passing through the outer jacket of the tubing portion 74a operates to remove heat from the liquid coolant passing through the unit 70 and the air is cooled as it passes over the tubing portion 74b in its flow from the inlet grill 14 and into the fan 24, in the manner discussed above. The cool air is discharged by the fan into the outer opening 20 and takes the flow path shown by the dashed arrows in FIG. 6, thus bypassing the heat exchanger 32. Upon the temperature of the room dropping to a point that the movable element of the thermostat 17 breaks the contact with the latter-mentioned fixed element, the compressor 73 will be turned off and the air circulating through the system will not be cooled by the unit 70 until the movable element moves back to the latter fixed element whereupon the compressor 73 will operate, and the unit 70 will again cool the air.

Upon the temperature of the room dropping to an extent that the movable element of the thermostat 17 moves to the other fixed element, the four-way valve associated with the unit 70 operates to reverse the cycle of the unit 70 and the latter to operate in a heating mode. In this operation, the water supplied to the outer jacket of the tubing portion 74a adds heat to the heat exchange medium, and the unit 70 operates in a heating mode to heat the air passing through the housing 12 before it is discharged from the outlet grill 16, as discussed above.

It is thus seen that the operation of this unit in the automatic mode provides heating or cooling without employing a central air conditioning unit or a central heating unit.

Due to the presence of the movable damper blade 64, and the plates 40 extending over the risers 34 and 36, the unit of FIGS. 5 and 6 is easily adapted for operation in a special heating mode for use in cold weather climates requiring a greater degree of heating than that made possible by the unit 70 operating in its heating cycle. In accordance with this operation, movement of the above-mentioned function switch to the special heating mode moves the damper blade 64 to the position shown by the solid lines in FIG. 6 and deactivates the compressor of the unit 70. Also, the risers 34 and 36 and their corresponding risers are connected in a circuit including a boiler, or the like, for supplying water at a relatively high temperature. In this special heating mode, the fan 24 would be connected to the thermostat 17 in a manner to cycle on and off in accordance with temperature variations as discussed in connection with the embodiment of FIGS. 1-4. Therefore, upon the thermostat 17 calling for heat, the air passing in through the inlet grill 14 is heated upon passing from the fan 24 over the hot heat exchanger 32 before it is discharged through the outlet grill 16.

It can be appreciated that in climates in which heating is required but cooling is not absolutely necessary, the unit of FIGS. 5-7 can be installed for operation in a heating mode only utilizing the heat exchanger 32, with the addition of the air conditioning unit 70 being optional to the occupants of the individual apartments or rooms. This would require the addition of only a cooling tower to the building and connection facilities to connect the risers 34 and 36 to the boiler for circulating hot water, or to the cooling tower for circulating water at the above-mentioned intermediate temperature range so that the air conditioning unit 70 can operate in its cooling mode, as discussed above. This flexibility is particularly advantageous in climates where heating is absolutely necessary while the need for cooling is marginal. As a result, the individual occupants of the rooms can have cooling at their own option by simply having a unit 70 installed in their respective housings 12. As a result, the rest of the occupants do not have to share in the expense of a central air conditioning unit.

In each of the previous embodiments, the drain pan 22 serves to collect condensation caused by the heat exchange occurring in the housing 12, it being understood that the drain riser 42 is notched in the vicinity of the pan so that excess condensation is transferred through the latter pipe and its corresponding pipes to a central drain, preferably located in the basement of the building. As stated above, further details of this drain system are set forth in the cited application.

Figure 9:
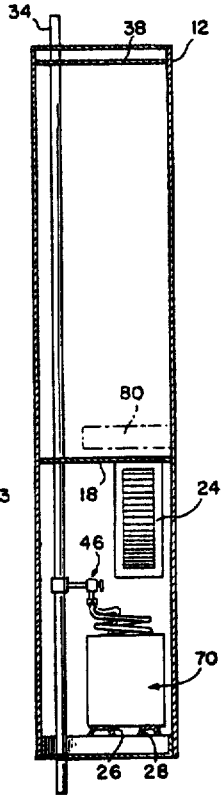

The unit depicted in the embodiment of FIG. 9 is a simplified version which eliminates the function switch, the movable damper blade, the heat exchanger plates, and the drain riser. Otherwise the structure is identical to that of the previous embodiments and is therefore given identical reference numbers.

According to the embodiment of FIG. 9, the air conditioning unit 70 is supplied by water in an intermediate temperature range in a manner so that the unit can operate both in a cooling mode and in a heating mode as discussed in connection with the automatic operation of the unit of the embodiment of FIGS. 5-8. The fan 24 operates continuously and the thermostat 17 is of the dead band variety and controls the operation of the compressor 73 and the position of the four-way valve controlling the direction of flow of the heat exchange medium through the tubing portions 74a and 74b, also in a manner identical to the operation of the unit of FIGS. 5-8 in the automatic mode.

In operation, the air passes through the inlet grill 14 and over the unit 70 where it is either heated or cooled, and then through the fan 24 and outwardly through the discharge opening into the upper compartment of the housing 12, where it flows upwardly and outwardly through the outlet grill 16.

In the event it is desired to provide a special heating mode for the winter season, an electrical heating unit 80 of a conventional design can be mounted in the upper compartment of the housing 12 immediately above the discharge opening 20. The unit 80 can be connected to the thermostat 70 in a manner to be turned on when the movable element of the thermostat contacts the fixed element thereof that operates the air conditioning unit in the heating mode, and turned off when the movable element breaks the contact with the latter fixed element. As in the previous special heating mode, the function switch deactivates the unit 70 in this position.

This unit, of course, enjoys several of the advantages of the unit of FIGS. 5–8 and yet is cheaper in cost since it eliminates the above-mentioned components.

Of course, variations of the specific construction and arrangement of the units disclosed above can be made by those skilled in the art without departing from the invention as defined in the appended claims.

I claim:

1. An air conditioning system for installation in a building, said system comprising an elongated housing, means dividing said housing into two compartments, an air inlet associated with one compartment and an air outlet associated with the other compartment, two vertically extending risers disposed in said housing and extending the length of said housing for direct connection to the risers of corresponding units located on adjacent floors of said building to form a continuous flow circuit for a heat exchange medium, one of said compartments having means therein for supporting a refrigerant cycling unit, means in said one compartment for connecting said risers to said refrigerant cycling unit in a manner to place said heat exchange medium in a heat exchange relation to said refrigerant, and means in said housing for circulating ambient air into said inlet, through said compartments and out from said outlet.

2. The system of claim 1 wherein the end portions of each of said risers project out from the ends of said housing to permit said connection between adjacent housings.

3. The system of claim 1 further comprising a plurality of fins disposed on said risers and forming heat exchange surfaces for said heat exchange medium, and means in said housing for directing said air over said fins.

4. The system of claim 1 further comprising thermostat means for controlling the operation of said circulating means in response to the temperature in the vicinity of said housing.

5. The system of claim 1 further comprising a plurality of fins disposed on said risers and forming heat exchange surfaces for said heat exchange medium, and means in said housing for directing the flow of air through said housing in a first path passing over said fins or in a second path bypassing said fins.

6. The system of claim 5 wherein said air directing means comprises a damper blade movable between a first and a second position in which it selectively directs said air in said path.

7. The system of claim 6 further comprising thermostat means for controlling said movement of said damper blade in response to the temperature in the vicinity of said housing.

8. The system of claim 1 further comprising a refrigerant cycling unit disposed in said one compartment for conditioning the air passing through said one compartment.

9. The system of claim 8 further comprising electric heating means disposed in said housing and in the path of the air flow through said housing to heat said air.

10. The system of claim 1 further comprising a refrigerant cycling unit disposed in said one compartment, said unit adapted to operate in a regular mode for cooling the air passing through said one compartment and a reverse mode for heating the air passing through said one compartment.

11. The system of claim 10 wherein said refrigerant cycling unit comprises a first and second heat exchanger, means for circulating said refrigerant through said first and second heat exchangers and in a heat exchange relationship to said heat exchange medium at said first heat exchanger, and means for evaporating and condensing said refrigerant at said heat exchangers, the air being directed over said second heat exchanger as it circulates through said compartment.

12. The system of claim 10 further comprising valve means to reverse the cycle of said air conditioning unit so that it can function to selectively heat or cool said air, and thermostat means supported by said housing and responsive to a predetermined temperature in the vicinity of said housing for controlling the operation of said valve means.

13. The system of claim [11] *12* wherein said thermostat means also controls the operation of said refrigerant cycling unit in its regular mode and in its reverse mode.

14. The system of claim 1 further comprising electric heating means disposed in said housing and in the path of the air flow through said housing to heat said air.

15. The system of claim 14 wherein said electric heating means is disposed in said other compartment.

*16. The system of claim 8, wherein said dividing means divides said housing into an upper compartment and a lower compartment and wherein said refrigerant cycling unit is disposed in said lower compartment.*

*17. The system of claim 16, wherein said supporting means comprises support braces disposed in said lower compartment near the floor of said housing.*

*18. The system of claim 16, wherein said connecting means comprises a pair of horizontal pipes disposed in said lower compartment, said horizontal pipes extending between said vertical risers and said refrigerant cycling unit and being respectively connected to sections of said vertical risers disposed in said lower compartment; and coupling means coupling said horizontal pipes to said refrigerant cycling unit.*

*19. The system of claim 16, wherein said inlet is disposed in said lower compartment, said outlet is disposed in said upper compartment and said circulating means is disposed between said refrigerant cycling unit and said outlet, said circulating means being constructed and arranged to draw air from said inlet across a heat exchanger associated with said refrigerant cycling unit and to blow said air through said outlet.*

*20. The system of claim 1, wherein said housing is constructed and arranged to extend within a room in said building with one end of said housing disposed on the floor of said room and the other end of said housing extending to the ceiling of said room.*

* * * * *